United States Patent
Kurita et al.

(10) Patent No.: US 9,214,289 B2
(45) Date of Patent: Dec. 15, 2015

(54) ELECTROLYTIC CAPACITOR

(75) Inventors: Junichi Kurita, Osaka (JP); Kazuo Kawahito, Osaka (JP); Masatoshi Tasei, Kyoto (JP); Kazuaki Aoyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 226 days.

(21) Appl. No.: 14/000,826

(22) PCT Filed: Mar. 23, 2012

(86) PCT No.: PCT/JP2012/002021
§ 371 (c)(1),
(2), (4) Date: Aug. 21, 2013

(87) PCT Pub. No.: WO2012/140836
PCT Pub. Date: Oct. 18, 2012

(65) Prior Publication Data
US 2013/0329341 A1 Dec. 12, 2013

(30) Foreign Application Priority Data
Apr. 14, 2011 (JP) ................. 2011-089884

(51) Int. Cl.
| | | |
|---|---|---|
| H01G 4/228 | (2006.01) | |
| H01G 11/82 | (2013.01) | |
| H01G 9/012 | (2006.01) | |
| H01G 9/14 | (2006.01) | |
| H01G 9/15 | (2006.01) | |
| H01G 9/08 | (2006.01) | |

(52) U.S. Cl.
CPC ............. *H01G 11/82* (2013.01); *H01G 9/012* (2013.01); *H01G 9/08* (2013.01); *H01G 9/14* (2013.01); *H01G 9/15* (2013.01)

(58) Field of Classification Search
USPC ......... 361/523–525, 516–519, 528–529, 530, 361/535–536, 538, 540
See application file for complete search history.

(56) References Cited

U.S. PATENT DOCUMENTS 7,027,291 B2 * 4/2006 Horio et al. ................. 361/523
7,778,011 B2 * 8/2010 Fujii et al. ................... 361/523
(Continued)

FOREIGN PATENT DOCUMENTS

| JP | 02-106014 A | 4/1990 |
|---|---|---|
| JP | 2006-190925 A | 7/2006 |

(Continued)

OTHER PUBLICATIONS

International Search Report issued in PCT/JP2012/002021, dated Jun. 19, 2012 with English translation.

*Primary Examiner* — Nguyen T Ha
(74) *Attorney, Agent, or Firm* — McDermott Will & Emery LLP

(57) ABSTRACT

An electrolytic capacitor includes a multilayered-capacitor-elements unit, a pair of positive electrode terminals, a negative electrode terminal, and an outer-package resin. The multilayered-capacitor-elements unit includes multiple capacitor elements of which positive electrodes are oriented oppositely to each other. The positive electrodes are connected to the positive electrode terminals, respectively, and negative electrodes of the capacitor elements are connected to the negative electrode terminal. Each of the positive electrode terminals includes a bottom section and a double-back section on which the positive electrodes of the capacitor element is disposed. The double-back section is formed by doubling over an end section extending toward the negative electrode.

13 Claims, 9 Drawing Sheets

(56) References Cited

U.S. PATENT DOCUMENTS

2006/0262486 A1* 11/2006 Tadanobu et al. ............ 361/523
2007/0019366 A1   1/2007 Yamaguchi et al.

FOREIGN PATENT DOCUMENTS

| | | |
|---|---|---|
| JP | 2007-035691 A | 2/2007 |
| JP | 2008-172185 A | 7/2008 |

* cited by examiner

ELECTROLYTIC CAPACITOR

RELATED APPLICATIONS

This application is the U.S. National Phase under 35 U.S.C. §371 of International Application No. PCT/JP2012/002021, filed on Mar. 23, 2012, which in turn claims the benefit of Japanese Application No. 2011-089884, filed on Apr. 14, 2011, the disclosures of which Applications are incorporated by reference herein.

TECHNICAL FIELD

The present invention relates to electrolytic capacitors.

BACKGROUND ART

A multilayer electrolytic capacitor is used around a CPU of a notebook computer. This electrolytic capacitor is needed to have characteristics such as large capacity, a low ESR (Equivalent Series Resistance), a low ESL (Equivalent Series Inductance), and high reliability. Since a power supply has used a higher frequency in recent years, the ESL characteristic among others needs to be improved. The electrolytic capacitor encountering these demands from the market is described hereinafter with reference to FIG. 10 and FIG. 11, which are sectional views of a conventional electrolytic capacitor.

Conventional electrolytic capacitor 1 includes multilayered sheets of capacitor elements 4, a pair of positive electrode terminals 5, negative electrode terminal 6, and outer-package resin 7. Each of capacitor elements 4 includes positive electrode 2 at one end and negative electrode 3 at another end. Positive electrode 2 is connected to a top face of positive electrode terminal 5, and negative electrode 3 is connected to a top face of negative electrode terminal 6. Outer-package resin 7 covers capacitor elements 4 such that at least parts of undersides of positive electrode terminal 5 and negative electrode terminal 6 are exposed outside.

As FIG. 10 shows, each of positive electrodes 2 of capacitor elements 4 is oriented in opposite directions to each other alternately, and negative electrode terminals 6 are disposed between the pair of positive electrode terminals 5. This structure allows the magnetic fields to weaken each other, thereby lowering the ESL. Positive electrodes 2 of capacitor elements 4 and positive electrode terminal 5 are connected together by laser welding. This connection allows lowering the ESR and the ESL of electrolytic capacitor 1.

As FIG. 11 shows, both the ends of positive electrode terminal 5 are bent to form upper stage 8, and positive electrodes 2 are disposed on a top face of upper stage 8 or lead-frame 2A incorporating positive electrodes 2 is disposed on a top face of upper stage 8. Positive electrodes 2 are welded to upper stage 8 or lead-frame 2A is welded to upper stage 8. Although a scar from the welding (a welded mark) is left on a rear face of upper stage 8, it can be embedded in outer-package resin 7, so that only a flat region can be used as a mounting face. This structure allows improving a mounting reliability as well as a bonding reliability between positive electrode terminal 5 and outer-package resin 7 (e.g. refer to Patent Literature 1).

CITATION LIST

Patent Literature

PTL1: Unexamined Japanese Patent Application Publication No. 2007-035691

SUMMARY OF THE INVENTION

The present invention aims to lower the ESL of electrolytic capacitors while a mounting reliability of the capacitors and a bonding reliability to an outer-package resin are maintained.

The electrolytic capacitor of the present invention has a multilayered-capacitor-elements unit, a pair of positive electrode terminals, a negative electrode terminal, and an outer-package resin. The multilayered-capacitor-elements unit includes a first capacitor element and a second capacitor element. The first capacitor element includes a first positive electrode at a place closer to a first end of the electrolytic capacitor and a first negative electrode at a place closer to a second end opposite to the first end. The second capacitor element includes a second negative electrode at a place closer to the first end and a second positive electrode at a place closer to the second end. The first capacitor element and the second capacitor element are layered together such that the first negative electrode and the second negative electrode overlap each other. The pair of positive electrode terminals are connected to the first and the second positive electrodes, respectively. The negative electrode terminal is disposed between the pair of positive electrodes, and is connected to the first and the second negative electrodes. Outer-package resin covers the multilayered-capacitor-elements unit such that at least parts of the pair of the positive electrode terminals and the negative electrode terminal 16 are exposed outside. Each of the pair of positive electrode terminals includes a bottom section and a double-back section, and the double-back section is formed by doubling over an end section, of the bottom section, extending toward the negative terminal. One of the first and second positive electrodes is disposed on the double-back section. This structure achieves an electrolytic capacitor having a smaller ESL.

DESCRIPTION OF EMBODIMENT

Figure 10:
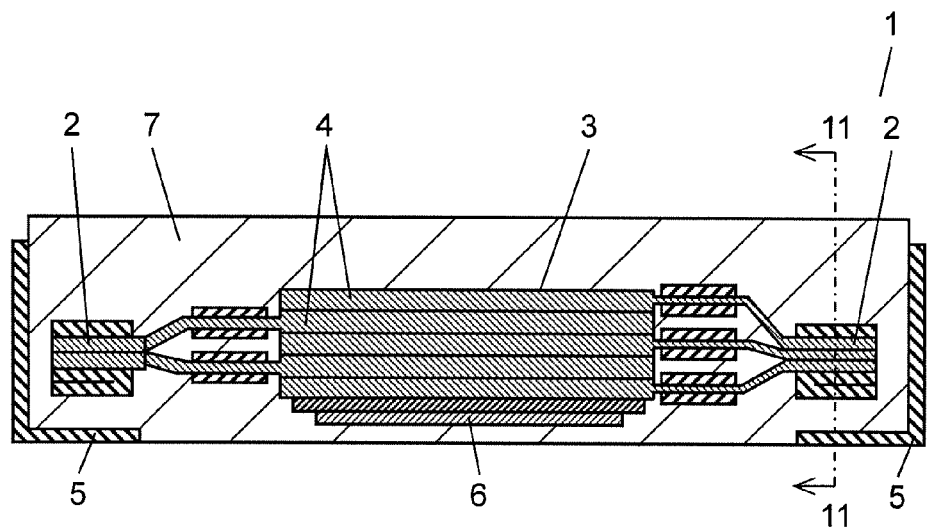
FIG. 10 is a sectional view of a conventional electrolytic capacitor.
Figure 11:
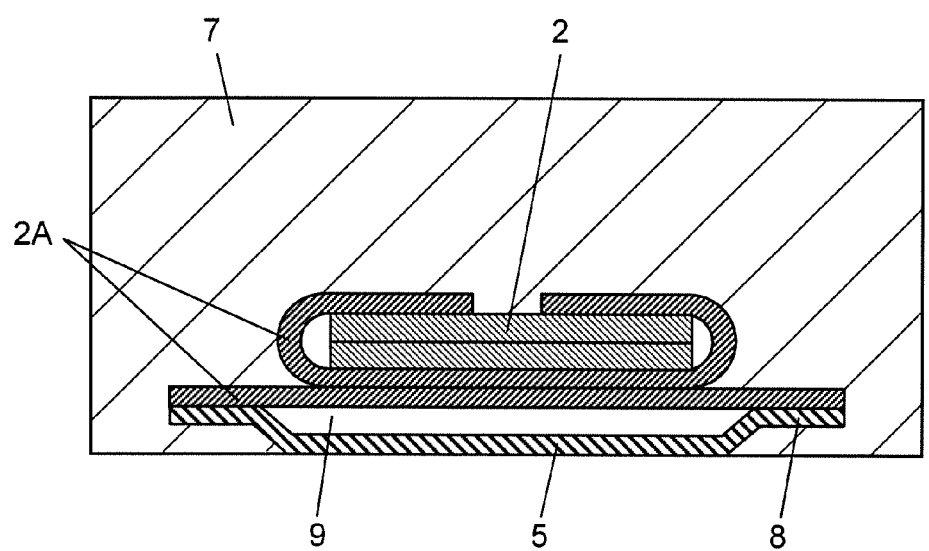
FIG. 11 is a sectional view of the conventional electrolytic capacitor shown in FIG. 10.

In the conventional structure shown in FIG. 10 and FIG. 11, space 9 is formed between positive electrode 2 of capacitor element 4 and positive electrode terminal 5 between upper stages 8. Space 9 makes a lead length of positive electrode 2 longer, and increases a current loop area between positive electrode terminal 5 and negative electrode terminal 6. This structure resultantly invites a higher ESL.

The electrolytic capacitor demonstrated hereinafter aims to address the problem discussed previously. A multilayer electrolytic capacitor having conductive polymer as electrolyte is used in the following embodiment.

Exemplary Embodiment

Figure 1:
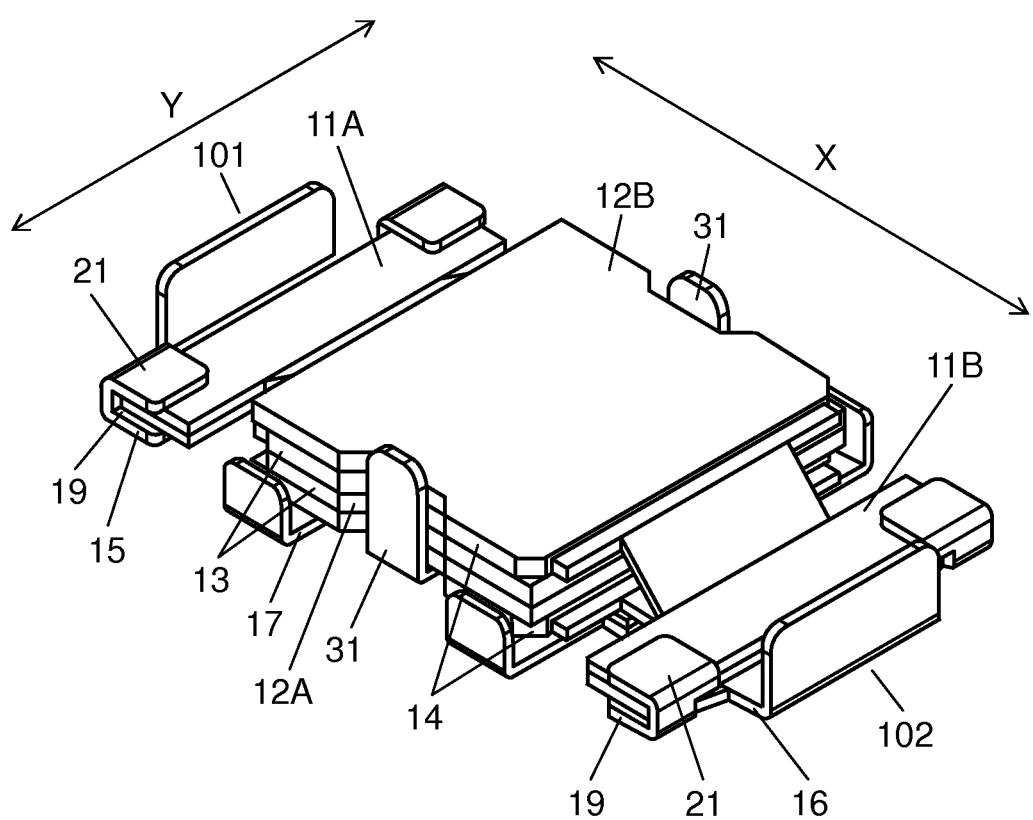
FIG. 1 is a perspective top view of an electrolytic capacitor, omitting an outer-package resin, in accordance with an embodiment of the present invention.
Figure 2:
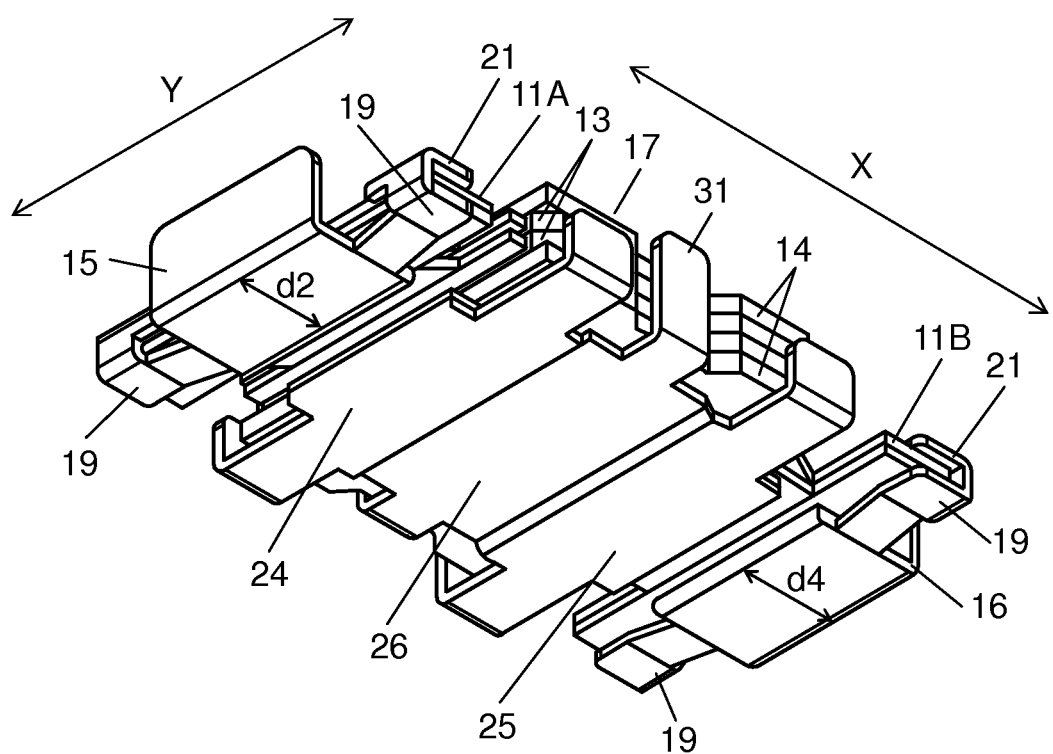
FIG. 2 is a perspective bottom view of the electrolytic capacitor, omitting the outer-package resin, shown in FIG. 1.
Figure 3A:
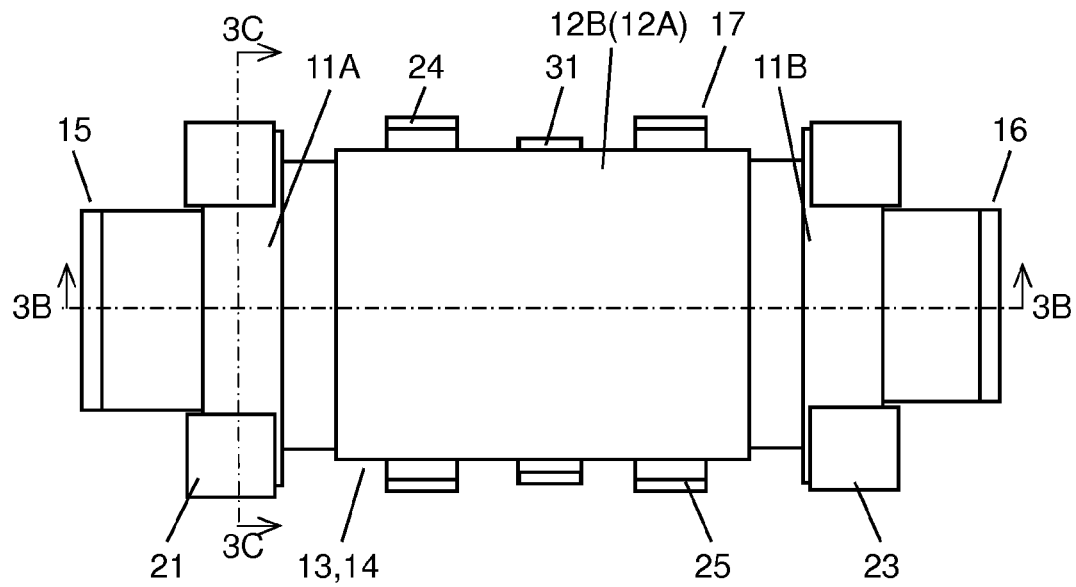
FIG. 3A is a schematic top view of the electrolytic capacitor, omitting the outer-package resin, shown in FIG. 1.
Figure 3B:
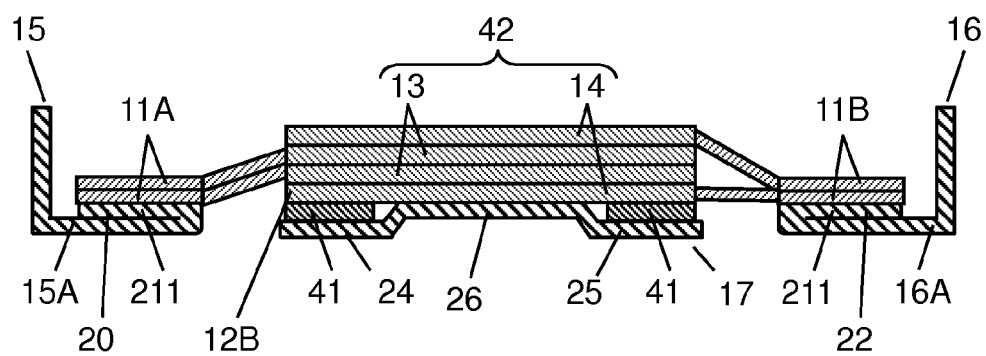
FIG. 3B is a sectional view of the electrolytic capacitor, omitting the outer-package resin, shown in FIG. 3A.
Figure 3C:
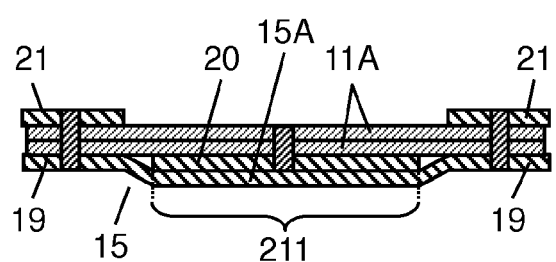
FIG. 3C is a sectional view of the electrolytic capacitor, omitting the outer-package resin, shown in FIG. 3A.
Figure 4:
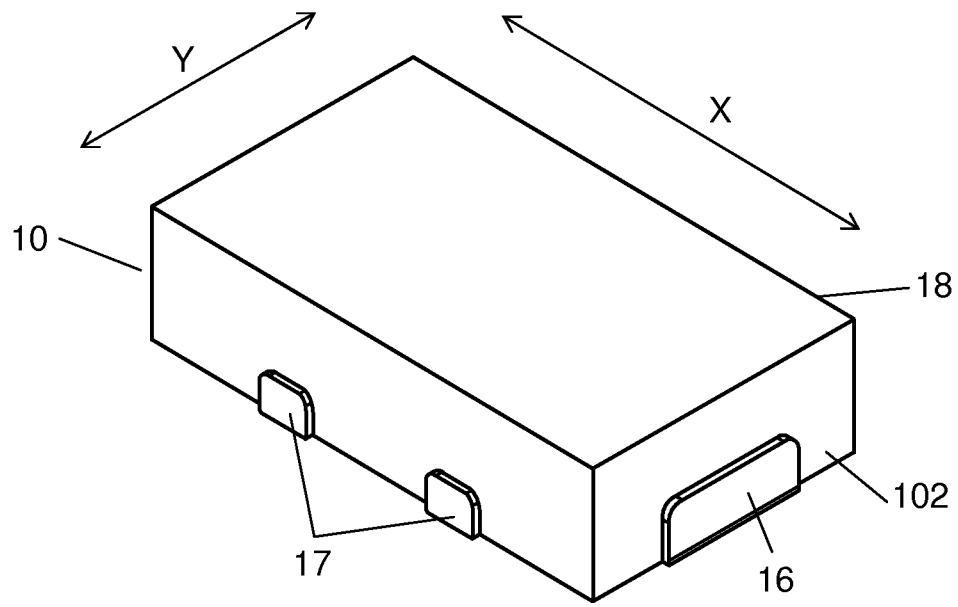
FIG. 4 is a perspective top view of the electrolytic capacitor in accordance with the embodiment of the present invention.
Figure 5:
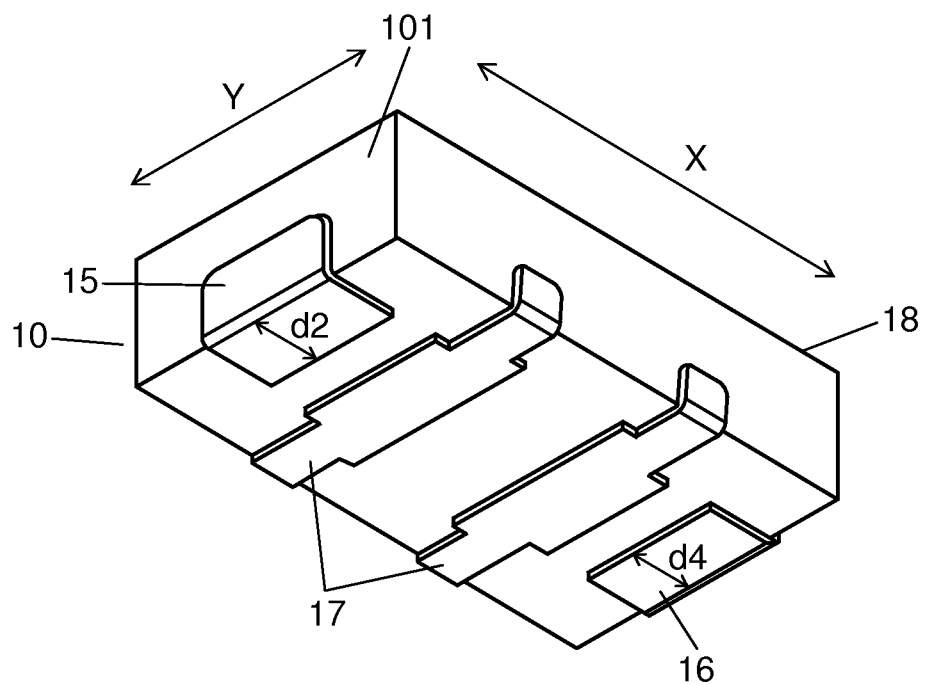
FIG. 5 is a perspective bottom view of the electrolytic capacitor shown in FIG. 4.

FIGS. 1, 2, and 3A are a perspective top view, a perspective bottom view, and a top view of an electrolytic capacitor in accordance with the embodiment of the present invention. In the drawings, an outer-package resin is omitted for a simpler description. FIGS. 3B and 3C are sectional views of the electrolytic capacitor, omitting the outer-package resin, shown in FIG. 3A. FIGS. 4 and 5 are a perspective top view and a perspective bottom view of the electrolytic capacitor, including the outer-package resin, in accordance with the embodiment of the present invention.

As FIGS. 4 and 5 show, electrolytic capacitor 10 includes first end 101 and second end 102 opposite to first end 101. As FIG. 1-FIG. 3C show, electrolytic capacitor 10 includes multilayered-capacitor-elements unit (hereinafter simply referred to as "layered body") 42, a pair of positive electrode terminals 15, 16, negative electrode terminal 17, and outer-package resin 18. Layered body 42 includes first capacitor element (hereinafter simply referred to as "element") 13, second capacitor element (hereinafter simply referred to as "element") 14 layered on element 13. Element 13 includes first positive electrode 11A at a place closer to first end 101, and first negative electrode 12A at a place closer to second end 102. Element 14 includes second negative electrode 12B at a place closer to first end 101, and second positive electrode 11B at a place closer to second end 102. First negative electrode 12A and second negative electrode 12B overlap each other. Positive electrode terminal 15 is connected to first positive electrode 11A, and positive electrode terminal 16 is connected to second positive electrode 11B. Negative electrode terminal 17 is disposed between positive electrode terminals 15 and 16, and connected to both of first negative electrode 12A and second negative electrode 12B. Outer-package resin 18 covers layered body 42 such that at least parts of positive electrode terminals 15, 16 and negative electrode terminal 17 are exposed outside.

Positive electrode terminal 15 includes bottom section 15A and double-back section 211 on which first positive electrode 11A is disposed. Double-back section 211 is formed by doubling over end section 20, of bottom section 15A, extending toward negative electrode terminal 17. In a similar way, positive electrode terminal 16 includes bottom section 16A and double-back section 211 on which second positive electrode 11B is disposed. This double-back section 211 is formed by doubling over end section 22, of bottom section 16A, extending toward negative electrode terminal 17.

In other words, as shown in FIG. 1, element 13 includes positive electrode 11A at one end and negative electrode 12A at another end. Element 14 includes positive electrode 11B at one end and negative electrode 12B at another end. Negative electrodes 12A and 12B are layered together, and positive electrodes 11A and 11B are disposed oppositely to each other. Elements 13 and 14 are layered together. The foregoing structure allows the magnetic fields to cancel each other as is done in the conventional electrolytic capacitor, thereby achieving a lower ESL.

Each one of elements 13 and 14 can be formed of a single sheet or multiple sheets. In the case of using the multiple sheets, the number of sheets is preferably the same or a difference can be at most one sheet, because the same or about the same number of sheets enables the magnetic fields to cancel each other. Elements 13 and 14 can be layered alternately one by one, or sheets by the same number of sheets, or they can be layered randomly.

Element 13 disposed on the lowest stage among multiple elements 13 is connected to positive electrode terminal 15 at the underside of electrode 11A. This connecting method does not limit positive electrode 11A of element 13 to be joined directly to positive electrode terminal 15. For instance, multiple positive electrodes 11A are integrated into one unit by a lead frame (not shown) made of another conductive material, and this lead frame can be connected onto a top face of positive electrode terminal 15. Here is another method: a spacer (not shown) is disposed on the top face of positive electrode terminal 15, and positive electrode 11A can be disposed on a top face of this spacer. The foregoing connecting method includes these methods.

Element 14 disposed on the lowest stage among multiple elements 14 is connected to positive electrode terminal 16 at an underside of positive electrode 11B. This connecting method, as discussed above, does not limit positive electrode 11B be to joined directly to positive electrode terminal 16. Positive electrode 11B can be indirectly connected to positive electrode terminal 16 via a lead frame or a spacer.

The underside of negative electrode 12A of element 13 disposed on the lowest stage or the underside of negative electrode 12B of element 14 disposed on the lowest stage is directly connected to the top face of negative electrode terminal 17 or indirectly connected thereto via the lead frame or the spacer. As FIGS. 1 and 2 show, negative electrode terminal 17 is disposed between positive electrode terminals 15 and 16.

Then as FIGS. 4 and 5 show, outer-package resin 18 covers elements 13 and 14 such that at least parts of the underside of positive electrode terminals 15, 16 and negative electrode terminal 17 are exposed outside.

Figure 6:
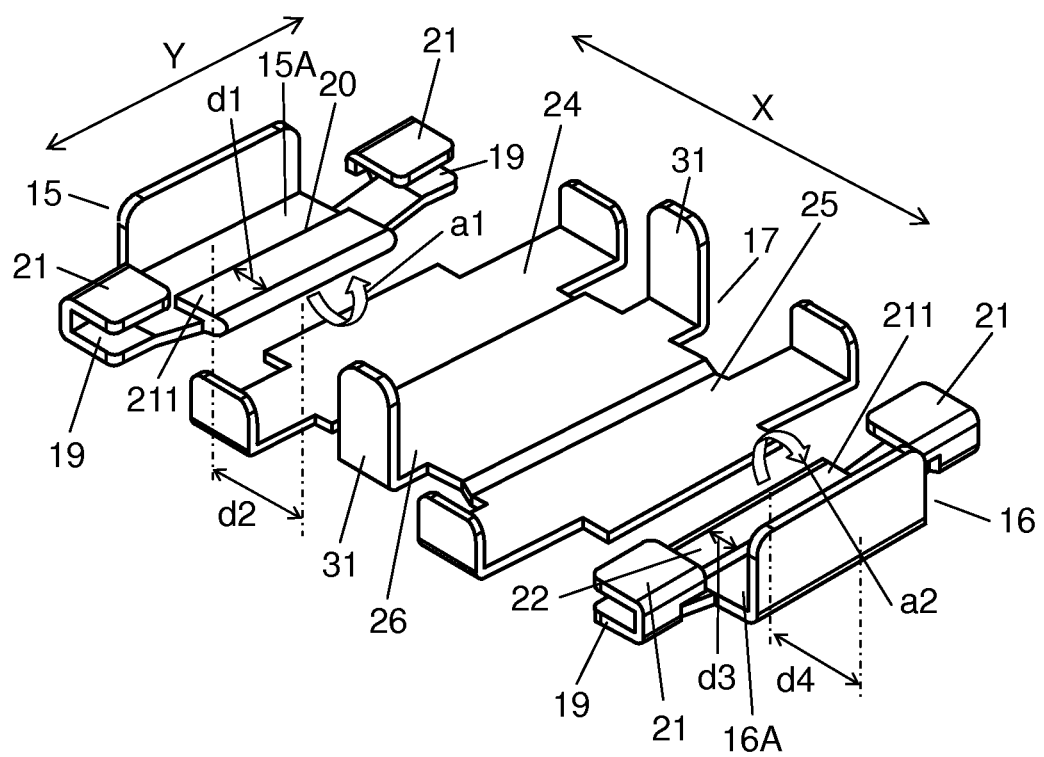
FIG. 6 is a perspective top view of positive electrode terminals and a negative electrode terminal of the electrolytic capacitor shown in FIG. 1.

As FIGS. 2, 3C, and 6 show, positive electrode terminal 15 includes positive electrode terminal upper stage (hereinafter simply referred to as "upper stage") 19 that is formed by bending both ends, along a second direction, of positive electrode terminal 15 toward outer-package resin 18. The second direction (Y direction) intersects with a first direction (X direction) that connects positive electrode terminal 15 to negative electrode terminal 17. To be more specific, upper stage 19 is formed by bending the ends, along Y direction, of positive electrode terminal 15 from bottom section 15A in upward direction obliquely or vertically, and further bending the ends outward such that the top face of the end is in parallel with the bottom face, which serves as a mounting face, of bottom section 15A.

Positive electrode 11A is disposed on the top faces of upper stages 19 as a crossover thereof. In this embodiment, X direction intersects with Y direction at right angles.

As FIG. 6 shows, end section 20 extending toward negative electrode terminal 17 disposed between upper stages 19 is double-backed (by 180 degrees) along arrow a1, and is inserted into the space between the pair of upper stages 19. This double-back of end section 20 makes positive electrode terminal 15 doubled over, whereby double-back section 211 is formed.

A width of double-backed end section 20 (double-back width d1) is preferably not greater than 30% of width d2 of an underside (mounting face), exposed from outer-package resin 18, of positive electrode terminal 15. In other words, the double-back width of end section 20 is preferably not smaller than 30% of width d2 that is the width of the mounting face of positive electrode terminal 15. On a top face of double-backed end section 20, positive electrode 11A is disposed for being electrically connected thereto by laser welding or resistance welding. This welded connection shortens an electrical path between positive electrode 11A and the mounting face of positive electrode terminal 15, thereby reducing a current loop area. A wider double-back width d1 increases a contact area between positive electrode 11A and positive electrode terminal 15, and helps the ESR and the ESL decrease.

As shown in FIG. 1, pinch section 21 is formed by bending positive electrode terminal 15 in the shape of letter C at a section extending outward from upper stage 19. To be more specific, positive electrode terminal 15 can be further provided with a pair of pinch sections 21 by bending upper stages 19 such that they open toward X direction, whereby positive electrode 11A can be pinched between the pair of pinch sections 21 and upper stages 19.

Positive electrode 11A is thus pinched between pinch section 21 and upper stage 19, and as shown in FIG. 3C, they are integrated together by the laser welding or the resistance welding. Although scars from the welding are left on the underside of upper stage 19, the scars will not be exposed outside because upper stage 19 is embedded in outer-package resin 18. As a result, a flat mounting face of positive electrode terminal 15 can be expected, so that the mounting reliability is improved.

As FIG. 3C shows, positive electrode 11A and end section 20 can be welded together, whereby the ESR and the ESL can be further reduced. In this case, the bottom face of bottom section 15A is used as the mounting face, so that the bottom face is exposed from outer-package resin 18. It is thus preferable to weld positive electrode 11A to end section 20 by the laser from above with a welding condition so that the scars from welding cannot be formed on the underside of double-back section 211.

Alternatively, positive electrode 11A may be welded to at least one of upper stage 19 or pinch section 21, and positive electrode 11A may not be welded to double-back section 211. Also in this case, end section 20 formed by double-backing the positive electrode 15 can be embedded in the space formed by positive electrode 11A and positive electrode terminal 15 between upper stages 19, so that positive electrode 11A can be brought into contact with double-back section 211. This structure shortens the lead length of positive electrode 11A, and the electric current loop area between positive electrode terminal 15 and negative electrode terminal 17 can be reduced. As a result, electrolytic capacitor 10 having a lower ESL is obtainable.

Since end section 20 of positive electrode terminal 15 closer to negative electrode terminal 17 is double-backed before it is connected to positive electrode 11A, the distance between the positive electrode and the negative electrode can be shortened efficiently for achieving a lower ESL. Since upper stages 19 are provided to both the ends, along Y direction, of positive electrode terminal 15, the bottom face, i.e. the mounting face, of bottom section 15A of positive electrode 15 can be disposed as close as possible to negative electrode terminal 17.

In a case where elements 13 are layered, positive electrodes 11A can be integrated with a lead frame (not shown) in order to reduce variability in layering of positive electrodes 11A, and the lead frame can be joined to positive electrode terminal 15. The lead frame can be formed of copper plate, nickel plate, or iron plate with cooper plating.

Use of the lead frame; however, not only boosts the material cost, but also increases the ESR and the ESL by the thickness of the lead frame. Therefore, it is preferable to bend positive electrode terminal 15 for enclosing and integrating positive electrode 11A. This structure allows improving the low ESR characteristics as well as the low ESL characteristics at a lower cost.

As discussed above, positive electrode 11A of element 13 can be connected to positive electrode terminal 15 by welding, so that the lead length of the electrode can be shortened, which contribute to lowering ESL. Multiple positive electrodes 11A are enclosed in the shape of letter C, so that a lead-out area of the electrode can be increased, which contribute to lowering ESR.

As FIGS. 2 and 6 show, positive electrode terminal 16 can be also provided with upper stages 19 at both the ends along Y direction intersecting with X direction that extends between positive electrode terminal 16 and negative electrode terminal 17. Upper stages 19 are formed by bending terminal 16 toward outer-package resin 18. Positive electrodes 11B of element 14 are disposed on top faces of upper stages 19 as a crossover thereof.

As FIG. 6 shows, double-back section 211 is inserted into a space between a pair of upper stages 19. Double-back section 211 is formed by double-backing (by 180 degrees) end section 22, along arrow a2, extending toward negative electrode terminal 17 disposed between upper stages 19. The double-back of end section 22 makes positive electrode terminal 16 doubled over.

Width d3 of double-backed end section 22 is preferably not smaller than 30% of width d4 of the underside, exposed from outer-package resin 18, of positive electrode terminal 16. This underside serves as the mounting face.

Pinch section 21C, of positive electrode terminal 16, extending from upper stage 19 to the outside is preferably bent in the shape of letter C so that positive electrodes 11B of elements 14 are enclosed therein. The foregoing structure, the selection of the welding spots, and the effects thereof are the same as those explained in the case of positive electrode terminal 15.

As FIG. 6 shows, negative electrode terminal 17 includes lower stages 24 and 25 adjacent to positive electrode terminals 15 and 16 that are counterparts of negative electrode terminal 17. The undersides of lower stages 24 and 25 are exposed from outer-package resin 18 to the outside for being used as the mounting faces. A center section between lower stage 24 and lower stage 25 is bent upward into outer-package resin 18 to form negative electrode upper stage (hereinafter simply referred to as "upper stage") 26. Since this upper stage 26 is embedded in outer-package resin 18, the underside of upper stage 26 is covered with outer-package resin 18. In other words, negative electrode terminal 17 includes upper stage 26 having negative electrode 12A or 12B on its top face. This upper stage 26 is disposed between lower stages 24 and 25, and embedded in outer-package resin 18, and yet, lifted upward from lower stages 24 and 25. The capacitor element disposed on the lowest place is connected to the top face of upper stage 26 at negative electrode 12A or 12B by, e.g. conductive adhesive (not shown).

Upper stage 26 has end sections 31 along Y direction, and end sections 31 are bent upward at right angles. Negative electrodes 12A and 12B can be positioned with the aid of end sections 31. End sections 31 are connected to negative electrodes 12A and 12B by conductive adhesive, and negative electrode 12A is connected to negative electrode 12B by the conductive adhesive, so that they can be integrated together, thereby lowering the ESR and the ESL. End sections 31 are embedded in outer-package resin 18, whereby a joined area between outer-package resin 18 and negative electrode terminal 17 can be increased. This structure thus prevents outer-package resin 18 from coming off.

On top of that, since upper stage 26 is located at the center section away from positive electrode terminal 15 and 16, the mounting face of negative electrode terminal 17 can be disposed as close as possible to positive electrode terminals 15 and 16. As a result, the ESL can be lowered.

As FIG. 3B shows, the top faces of lower stages 24 and 25 are connected electrically to negative electrode 12B by conductive member 41 filled in the space between them. Conductive member 41 is formed of, e.g. conductive adhesive. This connection allows shortening an electrical path between negative electrodes 12A, 12B and negative electrode terminal 17, so that an electric current loop area can be reduced.

Figure 7:
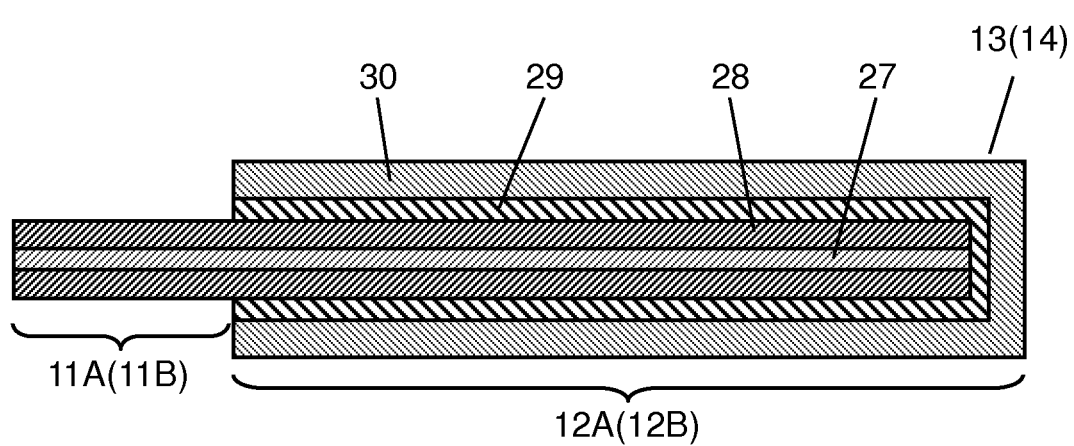
FIG. 7 is a sectional view of a capacitor element of the electrolytic capacitor shown in FIG. 1.

As FIG. 7 shows, elements 13 and 14 include base member 27, dielectric film 28, solid electrolytic layer 29, and negative electrode layer 30. Base member 27 is formed of aluminum foil having a thickness of 50-200 μm. Dielectric film 28 is formed on a surface of base member 27 and has a thickness about 10 nm. Solid electrolytic layer 29 is formed on dielectric film 28, and negative electrode layer 30 is formed on solid electrolytic layer 29.

Base member 27 can be formed of valve metal material, e.g. sintered tantalum wire, or evaporated film of titanium, instead of aluminum foil. Dielectric film 28 is formed of oxide or nitride, e.g. aluminum oxide, tantalum oxide, titanium oxide, titanium nitride, by the method of chemical conversion of positive electrode, spattering, or evaporation. Solid electrolytic layer 29 is formed of conductive polymer, e.g. polythiophene, polypyrrole. Negative electrode layer 30 is formed of, e.g. carbon layer, silver paste. The region, where no solid electrolytic layer 29 or negative electrode layer 30 is formed, serves as positive electrodes 11A, 11B of elements 13 and 14, and the region where solid electrolytic layer 29 and negative electrode layer 30 are formed serves as negative electrodes 12A, 12B.

Positive electrode terminals 15, 16, and negative electrode terminal 17 are produced by punching a copper plate, a nickel plate, or a copper-plated iron plate in a given pattern. Upper stages 19, 26 are formed by bending this punch-out plate. End sections 20, 22 are doubled over to form double-back sections 211. The end sections of upper stage 19 are bent along X direction like letter C to form pinch sections 21.

End sections 20, 22 are doubled over while they undergo a roll-pressing process, then the thickness can be reduced, whereby the heights of the fop face of upper stage 19 and the top face of double-back section 211 can be adjusted. As a result, positive electrodes 11A, 11B can be brought into contact with both of the top faces of upper stage 19 and double-back section 211. When the thicknesses of end sections 20, 22 doubled-over are thus reduced, the height from positive electrodes 11A, 11B to the mounting face can be lowered, which contributes to the ESL decrease.

Electrolytic capacitor 10 thus formed allows including a positive electrode of which height is, e.g. 0.2 mm and a negative electrode of which height is also, e.g. 0.2 mm. This height is a distance from the mounting face to the positive electrode or the negative electrode disposed at the lowest place. The distance between positive electrode terminal 15 and negative electrode terminal 17 can be 0.5 mm. The distance between positive electrode terminal 16 and negative electrode terminal 17 can be also 0.5 mm. The ESR and ESL of electrolytic capacitor 10 thus manufactured measure, e.g. 3.1 mΩ and 28.7 pH, respectively. These electrical characteristics are obtained by measuring ESR characteristics at 1 MHz with an impedance analyzer, and by measuring ESL characteristics at 500 MHz with a network analyzer.

When conventional electrolytic capacitor 1 shown in FIGS. 10 and 11 has the same height of a positive electrode and a negative electrode as those of capacitor 10, and has the same distance between the positive electrode and the negative electrode as that of capacitor 10, the ESR and the ESL of conventional capacitor 1 measure 3.7 mΩ and 48.3 pH, respectively.

Figure 8A:
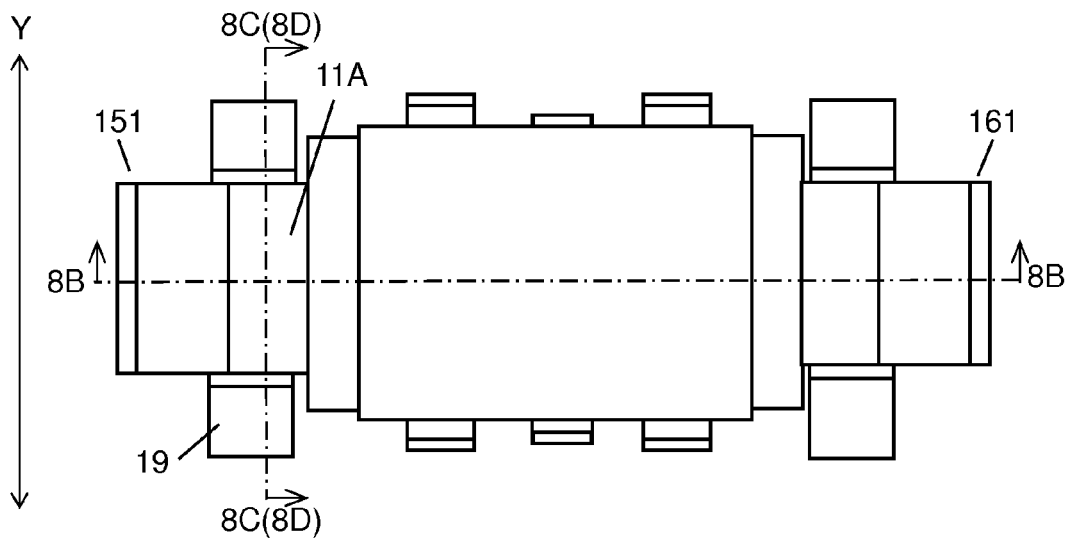
FIG. 8A is a schematic top view of another electrolytic capacitor, omitting an outer-package resin, in accordance with the embodiment of the present invention.
Figure 8B:
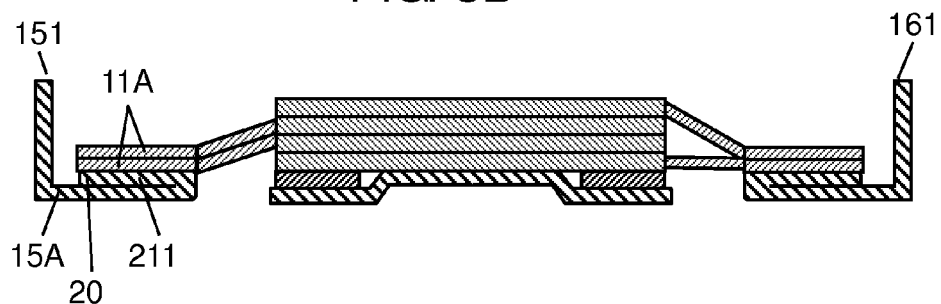
FIG. 8B is a sectional view of the electrolytic capacitor, omitting the outer-package resin, shown in FIG. 8A.
Figure 8C:
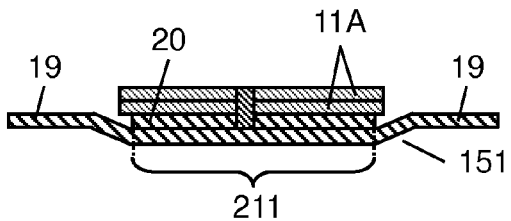
FIG. 8C is a sectional view of the electrolytic capacitor, omitting the outer-package resin, shown in FIG. 8A.

A positive electrode and a positive electrode terminal having different structures from what are discussed previously are demonstrated hereinafter with reference to FIGS. 8A-8C. FIG. 8A is a schematic top view of another electrolytic capacitor, omitting an outer-package resin, in accordance with the embodiment of the present invention. FIGS. 8B and 8C are sectional views of the electrolytic capacitor, omitting the outer-package resin, shown in FIG. 8A.

The structure shown in FIGS. 8A-8C is different from the structure shown in FIGS. 3A-3C in using positive electrode terminals 151, 161 instead of positive electrode terminals 15, 16. The length of positive electrode 11A along Y direction is shorter than the distance between upper stages 19. Positive electrode 151 in this structure does not have pinch section 21, and positive electrode 11A and positive electrode terminal 151 are welded together only at end section 20 of double-back section 211.

This structure allows electrically connecting double-back section 211 having a greater area to positive electrode 11A having a greater area, which contributes to lowering ESL and ESR. Since upper stages 19 are embedded in outer-package resin 18, outer-package resin 18 can be prevented from coming off positive electrode terminal 151. The description of positive electrode terminal 161 is similar to that of positive electrode terminal 151, so that it is omitted here.

Figure 8D:
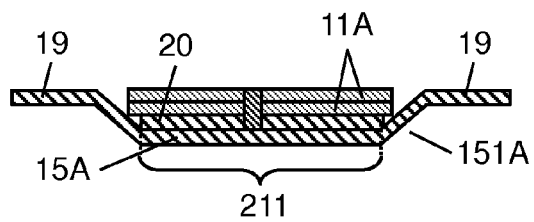
FIG. 8D is a sectional view of the electrolytic capacitor, omitting the outer-package resin, shown in FIG. 8A.

Furthermore, as shown in the sectional view of FIG. 8D, positive electrode terminal 151A, of which upper stages 19 have a greater height measured from the bottom face of bottom section 15A, can be used. This structure allows accommodating positive electrode 11A in a height-different space between upper stages 19 and bottom section 15A. As discussed above, the height of upper stage 19 from bottom section 15A does not limit.

Figure 9A:
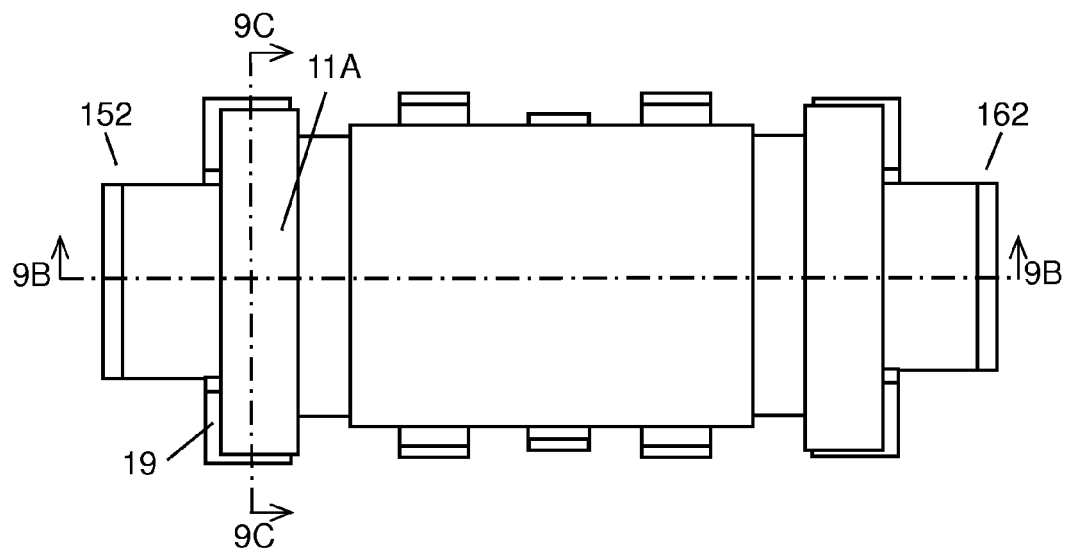
FIG. 9A is a schematic top view of still another electrolytic capacitor, omitting an outer-package resin, in accordance with the embodiment of the present invention.
Figure 9B:
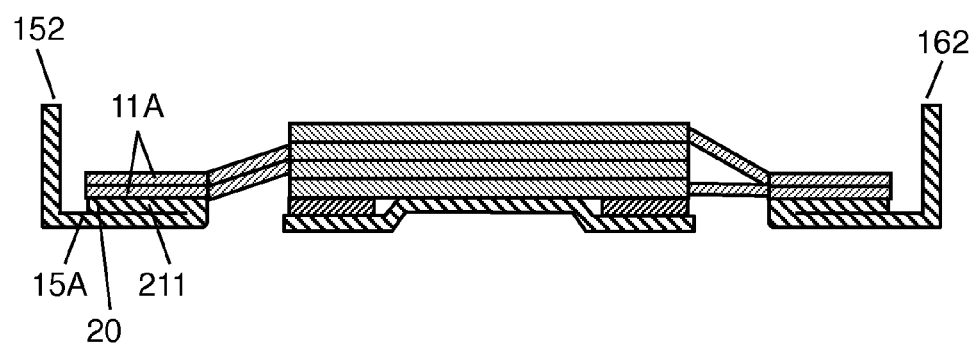
FIG. 9B is a sectional view of the electrolytic capacitor, omitting the outer-package resin, shown in FIG. 9A.
Figure 9C:
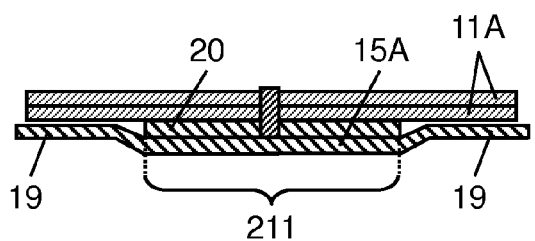
FIG. 9C is a sectional view of the electrolytic capacitor, omitting the outer-package resin, shown in FIG. 9A.

Another different structure of a positive electrode and a positive electrode terminal is demonstrated hereinafter with reference to FIGS. 9A-9C. FIG. 9A is a schematic top view of still another electrolytic capacitor, omitting its outer-package resin, in accordance with the embodiment of the present invention. FIGS. 9B and 9C are sectional views of the electrolytic capacitor, omitting the outer-package resin, shown in FIG. 9A.

The structure shown in FIGS. 9A-9C is different from the structure shown in FIGS. 3A-3C in the use of positive electrode terminals 152, 162 instead of positive electrode terminals 15, 16. Positive electrode terminal 152 does not have pinch section 21, and positive electrode 11A is welded to positive electrode terminal 152 only at end section 20 of double-back section 211.

This structure allows electrically connecting double-back section 211 having a greater area to positive electrode 11A having a greater area, which contributes to lowering ESL and ESR. This structure does not always require the height of the top face of upper stage 19 to be equal to the height of the top face of double-back section 211. The heights are measured from the bottom face of bottom section 15A.

However, when the height of the top face of upper stage 19 is equal to the height of the top face of double-back section 211, positive electrode 11A touches upper stages 19, so that the ESL and the ESR can be further reduced. On top of that, when these two heights are equal to each other, upper stages 19 can be welded to positive electrode 11A as is done in the structure shown in FIG. 3C.

Since upper stages 19 are embedded in outer-package resin 18, outer-package resin 18 can be prevented from coming positive electrode terminal 152. The description of positive electrode 162 is similar to that of positive electrode 152, so that it is omitted here.

INDUSTRIAL APPLICABILITY

The electrolytic capacitor of the present invention is excellent in ESL characteristics, so that it can be useful as a multilayer electrolytic capacitor to be used around a CPU of a notebook computer.

The invention claimed is:

1. An electrolytic capacitor comprising:
   a multilayered-capacitor-elements unit including:
      a first end and a second end opposite to the first end;
      a first capacitor element including a first positive electrode closer to the first end, and a first negative electrode closer to the second end;
   a second capacitor element including a second negative electrode closer to the first end and a second positive electrode closer to the second end, wherein the first capacitor element and the second capacitor element are layered together such that the first negative electrode and the second negative electrode overlap each other,
   a pair of positive electrode terminals connected to the first and the second positive electrodes, respectively;
   a negative electrode terminal disposed between the pair of positive electrode terminals and connected to the first and the second negative electrodes; and
   an outer-package resin covering the multilayered-capacitor-elements unit such that at least parts of the pair of positive electrode terminals and the negative electrode terminal are exposed outside,
   wherein each of the pair of positive electrode terminals includes:
   a bottom section; and
   a double-back section formed by doubling over an end section, of the bottom section, extending toward the negative electrode terminal, and one of the first and the second positive electrodes being disposed on the double-back section.

2. The electrolytic capacitor according to claim 1, wherein each of the pair of positive terminals further includes a pair of positive-electrode-terminal upper stages lifted upward in a layering direction of the first and the second capacitor elements from the bottom section, at both ends along a second direction intersecting with a first direction through the pair of positive electrode terminals and the negative electrode terminal, and wherein the double-back section is disposed between the pair of positive-electrode-terminal upper stages.

3. The electrolytic capacitor according to claim 2, wherein a height of a top face of the double-back section is equal to a height of a top face of the pair of positive-electrode-terminal upper stages, both the heights being measured from a bottom face of the bottom section, and one of the first and the second positive electrodes is disposed on the top face of the pair of positive-electrode-terminal upper stages.

4. The electrolytic capacitor according to claim 3, wherein the pair of positive-electrode-terminal upper stages is welded to one of the first and the second positive electrodes.

5. The electrolytic capacitor according to claim 3, wherein the double-back section is welded to one of the first and the second positive electrodes.

6. The electrolytic capacitor according to claim 2, wherein each of the pair of positive electrode terminals has a pair of pinch sections that are formed by bending the pair of positive-electrode-terminal upper stages so as to open toward the first direction, and pinch one of the first and the second positive electrodes between the pair of positive-electrode-terminal upper stages and the pair of pinch sections.

7. The electrolytic capacitor according to claim 6, wherein the pair of positive-electrode-terminal upper stages and the pair of pinch sections are welded to one of the first and the second positive electrodes.

8. The electrolytic capacitor according to claim 6, wherein a height of a top face of the double-back section is equal to a height of the top face of the pair of positive-electrode-terminal upper stages, both the heights being measured from a bottom face of the bottom section.

9. The electrolytic capacitor according to claim 8, wherein the double-back section, the pair of positive-electrode-terminal upper stages, and the pair of pinch sections are welded to one of the first and the second positive electrodes.

10. The electrolytic capacitor according to claim 1, wherein the double-back section is welded to one of the first and the second positive electrodes.

11. The electrolytic capacitor according to claim 1, wherein undersides of the pair of positive electrode terminals are exposed from the outer-package resin, and a length of the double-back section along the first direction is 30% or longer than a length of one of the pair of positive electrode terminals, along the first direction, at the undersides exposed from the outer-package resin.

12. The electrolytic capacitor according to claim 1, wherein the negative electrode terminal includes:
   a pair of lower stages of which underside at both ends is exposed outside, both the ends being adjacent to the pair of positive electrode terminals, and
   a negative-electrode-terminal upper stage disposed between the pair of lower stages and embedded in the outer-package resin, and yet lifted from the lower stages upward, and allowing one of the first and the second negative electrodes to dispose on a top face thereof.

13. The electrolytic capacitor according to claim 12 further comprising a conductive member that connects a top face of the lower stages to one of the first and the second negative electrodes.

* * * * *